US 6,670,006 B1

(12) United States Patent
Sugimori et al.

(10) Patent No.: US 6,670,006 B1
(45) Date of Patent: Dec. 30, 2003

(54) EPOXY RESIN COMPOSITION FOR FRP, PREPREG, AND TUBULAR MOLDING PRODUCED THEREFROM

(75) Inventors: Masahiro Sugimori, Nagoya (JP); Kazuya Gotou, Toyohashi (JP); Akira Agata, Toyohashi (JP); Yukio Nishimoto, Tokyo (JP); Masato Taguchi, Nagoya (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 0 days.

(21) Appl. No.: 09/381,628

(22) PCT Filed: Mar. 25, 1998

(86) PCT No.: PCT/JP98/01294

§ 371 (c)(1),
(2), (4) Date: Sep. 27, 1999

(87) PCT Pub. No.: WO98/44017

PCT Pub. Date: Oct. 8, 1998

(30) Foreign Application Priority Data

Mar. 27, 1997 (JP) .............................. 9-074794

(51) Int. Cl.$^7$ ................................ C08G 18/58
(52) U.S. Cl. ............... 428/36.9; 428/368; 428/413; 528/87; 528/88; 526/56; 526/58
(58) Field of Search ............... 428/368, 36.9, 428/413; 528/87, 88, 103; 526/56, 58

(56) References Cited

U.S. PATENT DOCUMENTS

| 4,859,533 A | * | 8/1989 | Seiya et al. ............ 428/366 |
| 5,112,932 A | * | 5/1992 | Koenig et al. ............ 528/51 |
| 5,480,958 A | | 1/1996 | Starner et al. ............ 528/96 |
| 5,545,697 A | | 8/1996 | Uchida ............ 525/403 |

FOREIGN PATENT DOCUMENTS

| CN | 1113071 A | 12/1995 |
| EP | 0 256 130 | 2/1988 |
| EP | 0 296 450 | 12/1988 |
| JP | 5-43655 | 2/1993 |
| JP | 5-43657 | 2/1993 |
| JP | 5-222160 | 8/1993 |
| JP | 6-56961 | 3/1994 |
| JP | 8-59793 A | 3/1996 |
| JP | 8-127635 | 5/1996 |
| JP | 9-71634 A | 3/1997 |
| JP | 9-100358 A | 4/1997 |

OTHER PUBLICATIONS

Derwent Abstracts, AN 097226, CA 2 038 786, Sep. 23, 1991.

* cited by examiner

Primary Examiner—William P. Watkins, III
Assistant Examiner—Sow-Fun Hon
(74) Attorney, Agent, or Firm—Oblon, Spivak, McClelland, Maier & Neustadt, P.C.

(57) ABSTRACT

The present invention relates to an epoxy resin composition for FRP that will be used for fishing rods, golf club shafts, and the like, a prepreg that is an intermediate material made up of an epoxy resin composition combined with reinforcing fibers, and a tubular molded article obtained using it. The epoxy resin composition for FRP of the present invention comprises (A) a bisphenol A-type epoxy resin, (B) an epoxy resin having oxazolidone rings, and (C) a curing agent. By using the epoxy resin composition for FRP of the present invention, a prepreg quite excellent in handleability and a tubular molded article improved in flexural strength in the longitudinal direction and crushing strength in the diametrical direction can be obtained.

26 Claims, No Drawings

EPOXY RESIN COMPOSITION FOR FRP, PREPREG, AND TUBULAR MOLDING PRODUCED THEREFROM

TECHNICAL FIELD

The present invention relates to an epoxy resin composition for fiber reinforced plastics (abbreviated to FRP in this specification), a prepreg that is an intermediate material made up of a combination of an epoxy resin composition and reinforcing fibers, and a tubular molded article obtained by the use thereof.

This application is based on a patent application in Japan (Japanese Patent Application No. Hei 9-74794) and the contents described in that Japanese application are taken as part of this description.

BACKGROUND ART

Since epoxy resins after curing are excellent in mechanical properties, electrical properties, and adhesive properties, they are widely used in the fields, for example, of sealants for electronic materials, paints, coating materials, and adhesives. Further, epoxy resins are important as matrix resins for FRP. Particularly, when carbon fibers are used as reinforcing fibers for FRP, epoxy resins are preferably used since they are excellent in adhesion to carbon fibers. FRP molded articles made up of carbon fibers and epoxy resins are used in wide range of applications ranging from general-purpose use in fishing rods, golf club shafts, etc. to the use in airplanes.

The method for molding FRP molded articles from reinforcing fibers, such as carbon fibers, and a matrix resin, such as an epoxy resin, includes several methods. If carbon fibers are used as reinforcing fibers, a method wherein an intermediate material called a prepreg prepared by impregnating in advance the reinforcing fibers with a resin is used for the molding of an FRP molded article is most widely used. The matrix resin used in this prepreg is required to be excellent, for example, in adhesion to the reinforcing fibers and mechanical properties after the molding. Further, the prepreg is required to have suitable tack in order to make the handling good. Since epoxy resins can be made to exhibit relatively easily these properties in a well balanced manner, they are widely used as a matrix resin for prepregs.

The major application of these FRP molded articles includes tubular molded articles, such as fishing rods and golf club shafts. Such tubular molded articles are required to have, as important properties, flexural strength in the longitudinal direction and crushing strength in the diametrical direction.

In order to enhance the flexural strength of tubular molded articles in the longitudinal direction, it is already known that it is effective to arrange carbon fibers along the length. Further, in order to improve the crushing strength of tubular molded article in the diametrical direction, it is already known that it is effective to arrange carbon fibers circumferentially. However, when a tubular molded article is reinforced longitudinally and circumferentially at the same time, the tubular molded article inevitably increases in weight. An increase in weight of a tubular molded article runs counter to the recent trend wherein fishing rods and golf club shafts are made light in weight. Accordingly, there have been attempted to improve matrix resins to reduce the circumferential reinforcement of tubular molded articles. However, matrix resins that can make tubular molded articles light in weight are not now available.

The present invention aims at providing an epoxy resin composition for FRP in order to obtain tubular molded articles improved in flexural strength in the longitudinal direction and crushing strength in the diametrical direction and a prepreg made of a combination of that epoxy resin composition for FRP and reinforcing fibers.

DISCLOSURE OF THE INVENTION

The first subject matter of the present invention resides in an epoxy resin composition for FRP, characterized in that it comprises (A) a bisphenol A-type epoxy resin (hereinafter referred to as component (A)), (B) an epoxy resin having oxazolidone rings represented by (hereinafter referred to as component (B)), and (C) a curing agent (hereinafter referred to as component (C)), the component (B) is an epoxy resin having a structure represented by the following formula (1):

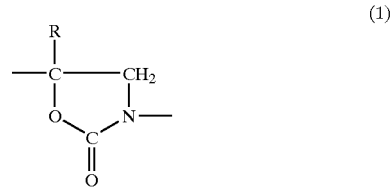

wherein R represents a hydrogen atom or a methyl group, and the viscosity measured by the below-described method for measuring viscosities is 100 to 5,000 poises.

Method for Measuring Viscosities

Use is made of a dynamic viscoelasticity measuring instrument, the uncured epoxy resin composition for FRP whose viscosity will be measured is filled between two disk plates 25 mm in diameter that are positioned with a space of 0.5 mm between them, one of the disk plates is rotated at a shear rate of 10 radians/sec, and the viscosity of the epoxy resin is measured under conditions in which the atmospheric temperature for the measurement is 60° C.

The second subject matter resides in an epoxy resin composition for FRP, characterized in that it comprises a component (A), a component (B), and a component (C), and (D) a thermoplastic resin that can be dissolved in a mixture of the component (A) and the component (B) (hereinafter referred to as component (D)) and has a viscosity of 100 to 5,000 poises measured by the above method.

Further, the third subject matter resides in a prepreg comprising a sheet of reinforcing fibers impregnated with the above epoxy resin composition for FRP.

Further the fourth subject matter resides in a tubular molded article having a plurality of FRP layers, characterized in that the matrix resin composition used in at least one of the FRP layers is the above epoxy resin composition for FRP.

And the fifth subject matter resides in an epoxy resin composition for FRP, characterized in that when the epoxy resin composition for FRP is molded into a tubular product, the crushing strength is 200 N or more.

In the present invention, "crushing strength" means the crushing strength, measured by the below-described method, of a tubular molded article that has an inner diameter of 10 mm, an outer diameter of 12 mm, and a volume content of fibers of 60+1% and is prepared by impregnating carbon fibers having an elastic modulus of 220 to 250 GPa with the epoxy resin composition for FRP to make unidirectional prepregs wherein the carbon fiber areal weight is 150 g/m² and the content of the epoxy resin for FRP is 31% by weight and laminating the unidirectional prepregs so that the directions of the fibers may be +45°/−45°/+45°/−45°/0°/0°/0°.

Method for Measuring Crushing Strength

The above-described tubular molded article is cut into a length of 10 mm to obtain a test piece. Using an indenter, a load is exerted on the test piece and the maximum load at which the test piece is broken when the indenter is moved at a rate of travel of 5 mm/min is measured and is designated as the crushing strength.

Further, the sixth subject matter resides in an epoxy resin composition for FRP, characterized in that when the epoxy resin composition for FRP is made into a unidirectional laminate, the flexural strength in a direction of 90° is 110 MPa or more.

In the present invention, "flexural strength in a direction of 90°" means the flexural strength of 90°, measured by the below-described method, of the unidirectional laminate that is prepared by impregnating carbon fibers having an elastic modulus of 220 to 250 GPa with the epoxy resin composition for FRP to make unidirectional prepregs wherein the carbon fiber areal weight is 150 g/m² and the content of the epoxy resin for FRP is 31% by weight and laminating fifteen unidirectional prepregs thus made (2 mm in thickness) so that the directions of the fibers may be 0 degrees.

Method for Measuring Flexural Strength in a Direction of 90°

The above-described unidirectional laminate is cut to obtain a test piece having a length of 60 mm in a direction of 90° to the direction of the fibers and a width of 10 mm. The maximum load when the test piece is broken is measured under conditions wherein the distance between the supports is 32 mm, the diameter of the tip of the indenter is 3.2 mm, and the rate of travel of the indenter is 2 mm/min and the flexural strength is calculated.

Best Mode for Carrying Out the Invention

As the component (A) of the epoxy resin composition for FRP of the present invention, those which are generally on the market can be used. As the component (A), those which when used in the epoxy resin composition for FRP bring its viscosity to the range described later may be used. The epoxy equivalent, the molecular weight, and the state at normal temperatures of the component (A) are not particularly restricted. Herein, "epoxy equivalent" in the present invention means the number of grams of the resin containing epoxy groups in an amount of 1 gram equivalent. As the component (A), a mixture of a bisphenol A-type epoxy resin having an epoxy equivalent of 300 or less that is a liquid or a semisolid at normal temperatures and a bisphenol A-type epoxy resin having an epoxy equivalent of 400 or more that is a solid at normal temperatures is preferably used because the strength in a direction of 90° to the direction of fibers can be exhibited. Further, particularly preferably, the bisphenol A-type epoxy resin having an epoxy resin equivalent of 300 or less is contained in an amount of 25 to 65% by weight in the component (A).

As typical ones of the bisphenol A-type epoxy resin having an epoxy equivalent of 300 or less that is a liquid or a semisolid at normal temperatures, EPIKOTE 828 and EPIKOTE 834 manufactured by Yuka Shell Epoxy K. K. can be mentioned by way of example.

As representative examples of the bisphenol A-type epoxy resin having an epoxy equivalent of 400 or more that is a solid at normal temperatures, EPIKOTE 1001, EPIKOTE 1002, EPIKOTE 1004, EPIKOTE 1007, and EPIKOTE 1009 can be mentioned by way of example.

As the component (B) of the epoxy resin composition for FRP of the present invention, an epoxy resin having oxazolidone rings represented by the below-shown formula (1) is used. This component (B) is an essential component for the purpose of the present invention for obtaining a tubular molded article that exhibits a high crushing strength. An epoxy resin composition for FRP that does not contain this component (B) can provide neither a tubular molded article having both a high crushing strength and a high flexural strength nor a prepreg good in handleability. Further it is also necessary to use an epoxy resin containing oxazolidone rings and epoxy groups in the molecule. A mixture of a compound containing oxazolidone rings and a compound containing epoxy groups can provide neither a tubular molded article having both a high crushing strength and a high flexural strength nor a prepreg good in handleability.

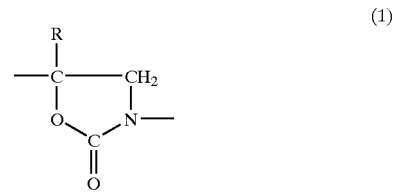

(1)

wherein R represents a hydrogen atom or a methyl group.

As the component (B), an epoxy resin having a structure represented by the below-shown formula (2) is particularly preferable. This component (B) can be synthesized by a method disclosed in Japanese Patent Application, First Publication No. Hei 5-43655 wherein an epoxy resin and an isocyanate compound are reacted in the presence of an oxazolidone ring forming catalyst. Further, as commercially available epoxy resins that can be used as the component (B), XAC4151 and XAC4152 manufactured by Asahi-Ciba Limited can be mentioned by way of example.

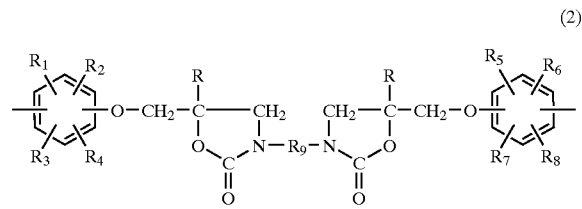

(2)

wherein R's each independently represent a hydrogen atom or a methyl group, $R_1$ to $R_4$ each independently represent a halogen atom, a hydrogen atom, or an alkyl group having 1 to 4 carbon atoms, $R_5$ to $R_8$ each independently represent a hydrogen atom or an alkyl group having 1 to 4 carbon atoms, and $R_9$ has the below-shown formula (3) or the below-shown formula (4).

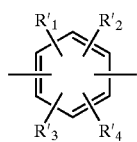

(3)

wherein $R'_1$ to $R'_4$ each independently represent a hydrogen atom or an alkyl group having 1 to 4 carbon atoms.

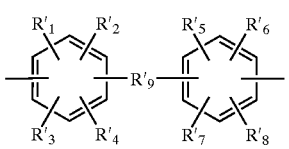

(4)

wherein $R'_1$ to $R'_8$ each independently represent a hydrogen atom or an alkyl group having 1 to 4 carbon atoms and $R'_9$ represents a single bond, —$CH_2$—, —$C(CH_3)_2$—, —$SO_2$—, —SO—, —S—, or —O—.

As the component (C) of the epoxy resin composition for FRP of the present invention, any curing agent can be used that is used as a curing agent for usual epoxy resin compositions. As typical curing agents, dicyandiamides, ureacompounds, amine compounds, acid anhydrides, imidazole compounds, phenol compounds, etc. can be mentioned by way of example. Among others, a combination of a dicyandiamide and a urea series compound is particularly preferable because the curability of the epoxy resin composition for FRP and the balance among the physical properties of the molded article obtained after the curing are good.

To the epoxy resin composition for FRP of the present invention, the component (D) can be added. By adding the component (D) to the epoxy resin composition for FRP, the handleability of the prepreg is further improved and the properties of the obtainable tubular molded article, such as the crushing strength, are improved and stabilized.

As the component (D) of the epoxy resin composition for FRP of the present invention, a thermoplastic resin that dissolves uniformly in a mixture of the component (A) with the component (B) is used. As the component (D), phenoxy resins and polyvinylformal resins are particularly preferably used. The phenoxy resins are not particularly restricted and those generally on the market can be used. For example, PHENOTOHTO YP-50 and PKHP-200 manufactured by Tohto Kasei Co., Ltd. etc. can be mentioned as typical examples thereof. As the polyvinylformal resin (hereinafter referred to as PVF), a resin containing 60% by weight or more of a vinyl formal moiety with the rest made up of vinylalcohol, vinylacetate, or the like is used. VINYLEC manufactured by Chisso Corporation can be mentioned as commercially available typical examples thereof.

The epoxy resin composition for FRP of the present invention is required to have a viscosity of 100 to 5,000 poises measured by the below-described method for measuring viscosities. If the viscosity of the epoxy resin composition for FRP is less than 100 poises at 60° C., the tack becomes too strong or the resin flow at the time of molding becomes too great, making it impossible to obtain the intended properties after the molding, which is unpreferable. Furthermore, if the viscosity of the epoxy resin composition for FRP is over 5,000 poises, the impregnation with the resin at the time of formation of a prepreg becomes insufficient, the tack is lost to too great an extent, or the prepreg becomes hard, making it impossible to obtain the intended properties after the molding, which is unpreferable. A more preferable range is from 300 to 3,000 poises.

The viscosity in the present invention is the viscosity measured by using a dynamic viscoelasticity measuring instrument, such as a dynamic viscoelasticity measuring instrument RDA-700 manufactured by Rheometric Scientific F. E. Ltd. in such a manner that the uncured epoxy resin composition for FRP whose viscosity will be measured is filled between two disk plates which are 25 mm in diameter that are positioned with a space of 0.5 mm between them, one of the disk plates is rotated at a shear rate of 10 radians/sec, and the viscosity of the epoxy resin is measured under conditions in which the atmospheric temperature for the measurement is 60° C.

The formulation ratio of the components in the epoxy resin composition for FRP of the present invention is not particularly restricted so long as the composition satisfies the above conditions including the viscosity conditions. If the component (D) is not contained, the formulation ratio [(A)/(B)] of the component (A) and the component (B) is preferably in the range of from 9/1 to 3/7 by weight. Further, particularly preferably, the component (B) accounts for 20 to 50% by weight of the mixture of the component (A) and the component (B).

Further, when the component (D) is contained, the formulation ratio [(A)/(B)] of the component (A) and the component (B) is preferably in the range of from 15/1 to 1/5 by weight and more preferably in the range of from 10/1 to 1/3 by weight. Further, most preferably, the component (B) accounts for 7 to 50% by weight of the mixture of the component (A) and the component (B).

When only a phenoxy resin is used as the component (D) of the epoxy resin composition for FRP of the present invention, the formulation ratio {(D)/[(A)+(B)]} of the components in the epoxy resin composition for FRP is preferably in the range of from 1/100 to 30/100 by weight and more preferably in the range of from 2/100 to 20/100 by weight. Further, when only a polyvinylformal resin is used as the component (D), the formulation ratio {(D)/[(A)+(B)]} of the components in the epoxy resin composition for FRP is preferably in the range of from 1/100 to 20/100 and more preferably in the range of from 1/100 to 10/100.

To the epoxy resin composition for FRP of the present invention, another epoxy resin (E) (hereinafter referred to as component (E)) can be added in the range wherein the above formulation ratios are satisfied. By adding the component (E) to the epoxy resin composition for FRP, the properties of the tubular molded article, such as the heat resistance, can further be improved.

As the component (E),. for example, bisphenol F-type, bisphenol S-type, glycidylamine-type, aminophenol-type, phenolic novolak- type, and cresol novolak-type epoxy resins, or aliphatic, cycloaliphatic, and other epoxy resins can be mentioned. Among others, phenolic novolak-type epoxy resins having a softening point of 60° C. or more are particularly preferable because they less adversely affect the balance of the entire properties of the epoxy resin composition for FRP. As typical examples of phenolic novolak-type epoxy resins having a softening point of 60° C. or more, EPICLON N-770 and N-775 manufactured by Dainippon Ink and Chemicals Inc. can be mentioned.

When the component (E) is added to the epoxy resin composition for FRP, the component (E) is contained in an amount of 3 to 20% by weight based on the total of the epoxy resin components consisting of the component (A), the component (B) and the component (E). Further, more preferably, the total amount of the component (B) added and the amount of the component (E) added is 20 to 50% by weight based on the total of the epoxy resin components consisting of the component (A), the component (B), and the component (E), and the composition ratio of the component (B) to the composition (E) is in the range of from 1/3 to 4/1.

As the epoxy resin composition for FRP of the present invention, those that are excellent in toughness in addition to the above conditions are more preferable. Specifically, an epoxy resin composition for FRP whose $G_{IC}$ (critical strain energy release rate) is 400 J/m² or more is particularly preferable. Herein, $G_{IC}$ can be measured by the compact tension method described in ASTM-E399.

A sheet of reinforcing fibers is impregnated with the epoxy resin composition for FRP of the present invention to make them integrated, thereby forming an intermediate material called a prepreg.

The reinforcing fibers used in the present invention are not particularly restricted and use is made of carbon fibers, glass fibers, aramid fibers, boron fibers, steel fibers, etc. singly or in combination. Among others, carbon fibers are particularly preferably used since the mechanical properties after molding are good.

As the carbon fibers, any of PAN precursor carbon fibers and pitch precursor carbon fibers can be used. Further, as the carbon fibers, various carbon fibers different in strength and elastic modulus can be selected and used according to the purpose.

Further, as the prepreg of the present invention, for example, a unidirectional prepreg wherein reinforcing fibers are arranged in one direction, a fabric wherein reinforcing fibers are woven, a nonwoven fabric of reinforcing fibers, or a prepreg prepared by impregnating a tow of reinforcing fibers directly with the epoxy resin composition for FRP of the present invention can be mentioned.

In the present invention, the sheetlike product wherein reinforcing fibers are arranged in one direction, the fabric wherein reinforcing fibers are woven, the nonwoven fabric made up of reinforcing fibers, the tow of reinforcing fibers, and the like are simply referred to as a sheet of reinforcing fibers.

The method for impregnating reinforcing fibers with the epoxy resin composition for FRP of the present invention is not particularly restricted. As the method for impregnating reinforcing fibers with the epoxy resin composition for FRP, a method wherein a sheet of reinforcing fibers is impregnated with the resin from both surfaces thereof is preferred over a method wherein a sheet of reinforcing fibers is impregnated with the resin from one surface thereof because, in the former case, when the sheet is molded into the tubular molded article intended by the present invention, the crushing strength and the flexural strength in a direction of 90° are improved.

When the epoxy resin composition for FRP of the present invention is made into a prepreg, the prepreg has suitable tack and flexibility and is good in the balance between stability with time and curability. In particular, when the epoxy resin composition for FRP of the present invention is made into a unidirectional prepreg of carbon fibers, such an effect is brought about that the flexural strength in a direction of 90° to the axes of the fibers of the molded article is considerably improved. As a result, the tubular molded article obtained by using the prepreg is improved considerably in crushing strength and flexural strength. Such an effect is difficult to obtain using conventional matrix resins and thus reflects the excellent performance of the epoxy resin composition of the present invention.

In particular, when a prepreg having a flexural strength of 125 MPa or more in a direction of 90° to the axes of the fibers is used, the crushing strength of the obtained tubular molded article is remarkably improved. Thus, the crushing strength is greatly affected by flexural strength in a direction of 90° to the axes of the fibers. Further, the effect of the elastic modulus of the carbon fibers used is also great and when carbon fibers having a high elastic modulus are used, generally a favorable crushing strength is readily be obtained.

Accordingly, when carbon fibers having a high elastic modulus are used, a good crushing strength is obtained even when the flexural strength in a direction of 90° to the axes of the carbon fibers is a little low. In particular, a good crushing strength is obtained in the case in which the flexural strength in a direction of 90° to the axes of the fibers and the elastic modulus of the carbon fibers used satisfy the following relationship:

flexural strength in a direction of 90° [MPa]≧2,500/the elastic modulus of the carbon fibers [GPa]

On the other hand, the lower the resin content in the prepreg is, the better it is, since the tubular molded article is made lighter in weight. However, a decrease in the resin content is apt to result in lowering of the flexural strength in a direction of 90° to the axes of the fibers. Particularly, in the case in which the resin content is less than 25% by weight, the tendency for the lowering thereof is increased. Therefore, when a conventional epoxy resin composition was used as a matrix resin, it was difficult to secure sufficient crushing strength with the resin content of the prepreg lowered to make the tubular molded article light in weight. However, when the epoxy resin composition of the present invention is used as a matrix resin, even if the resin content of the prepreg is brought to less than 25% by weight, the obtained tubular molded article exhibits a crushing strength improved more than that of the conventional one. Accordingly, the tubular molded article can be made light in weight with the properties including crushing strength satisfactorily maintained.

Particularly, when a tubular molded article is molded using a prepreg in which the flexural strength in a direction of 90° to the axes of the fibers, and the resin content of the prepreg and the elastic modulus of the carbon fibers satisfy the below-given relationship, the obtained tubular molded article is good in the balance between the effect of weight reduction and the physical properties including the crushing strength:

flexural strength in a direction of 90° [MPa]≧X/the elastic modulus of the carbon fibers [GPa]

wherein X represents 100,000×the resin weight fraction of the prepreg

Next, the tubular molded article made of FRP in which the above-described epoxy resin composition is used is described.

The tubular molded article of the present invention is a tubular molded article excellent in crushing strength and flexural strength and is obtained by using the above-described epoxy resin composition for FRP for the matrix resin of at least one FRP layer out of a plurality of FRP layers.

This tubular molded article is generally obtained by winding layers of prepregs around a mandrel and heating and pressing them. It is required that at least one of these layers consist of the prepreg which is the third mode of the present invention in order to obtain the desired properties. Further, if all of the layers consist of the prepregs of the present invention, excellent properties are obtained without any problems. However, since respective layers are generally allocated respective roles, it is not necessarily required that all the layers consist of the prepregs of the present invention.

Further, it is possible to use layered prepregs made up of the prepregs of the present invention and conventional prepregs, which results in more preferable physical properties in many cases. Further, the tubular molded article can be obtained by a method wherein tow prepregs are wound to form layers. As the heating and pressing method used in molding the tubular molded article, compression molding in which a mold, such as a metal mold, is used, autoclave molding, vacuum bag molding, tape lapping molding, etc. can be mentioned by way of example, but the method is not necessarily limited to them.

The epoxy resin composition for FRP of the present invention is preferably such that when the epoxy resin composition is molded into the tubular molded article, the crushing strength of the tubular molded article is 200 N or more, the tubular molded article having an inner diameter of 10 mm, an outer diameter of 12 mm, and a volume content of fibers of 60+1% and being prepared by impregnating carbon fibers having an elastic modulus of 220 to 250 GPa with the epoxy resin composition for FRP to make unidirectional prepregs in which the carbon fiber areal weight is 150 g/m² and the content of the epoxy resin for FRP is 31% by weight and laminating the unidirectional prepregs so that the directions of the fibers may be +45°/−45°/+45°/45°/0°/0°/0°. By defining the crushing strength of the above tubular molded article as being 200 N or more, the tubular molded article can be made light in weight by decreasing the number of the laminated FRP layers. The crushing strength of the tubular molded article is more preferably 240 N or more.

The epoxy resin composition for FRP of the present invention is preferably such that when carbon fibers having an elastic modulus of 220 to 250 GPa are impregnated with this epoxy resin composition for FRP to make unidirectional prepregs in which the carbon fiber areal weight is 150 g/m² and the content of the epoxy resin for FRP is 31% by weight and fifteen unidirectional prepregs thus made are laminated so that the directions of the fibers may be zero degrees, thereby making a unidirectional laminate (2 mm in thickness), the flexural strength in a direction of 90° is 110 MPa or more. Thus, by making the flexural strength of the above unidirectional laminate in a direction of 90° to be 110 MPa or more, the weight of the tubular molded article can be made light by decreasing the number of the laminated layers of the FRP layers. More preferably, the flexural strength of the above unidirectional laminate in a direction of 90° is 124 MPa or more and particularly preferably 140 MPa or more.

EXAMPLES

Hereinbelow, the present invention is described more specifically with reference to Examples.

Abbreviations for compounds, and the test methods in the Examples are as follows.

Component (A)

EP828: a bisphenol A-type epoxy resin, EPIKOTE 828 (epoxy equivalent: 184–194; liquid at normal temperatures), manufactured by Yuka Shell Epoxy K. K.

EP1001: a bisphenol A-type epoxy resin, EPIKOTE 1001 (epoxy equivalent: 450–500; solid at normal temperatures), manufactured by Yuka Shell Epoxy K. K.

EP1002: a bisphenol A-type epoxy resin, EPIKOTE 1002 (epoxy equivalent: 600–700; solid at normal temperatures), manufactured by Yuka Shell Epoxy K. K.

EP1004: a bisphenol A-type epoxy resin, EPIKOTE 1004 (epoxy equivalent: 875–975; solid at normal temperatures), manufactured by Yuka Shell Epoxy K. K.

Component (B)

XAC4151: an oxazolidone ring containing epoxy resin manufactured by Asahi-Ciba Limited XAC4152: an oxazolidone ring containing epoxy resin manufactured by Asahi-Ciba Limited Component (C)

PDMU: phenyldimethyl urea

DCMU: dichlorodimethyl urea

DICY: dicyandiamide

Component (D)

PY-50: a phenoxy resin, PHENOTOHTO, manufactured by Tohto Kasei Co., Ltd.

VINYLEC E: a polyvinylformal manufactured by Chisso Corporation

VINYLEC K: a polyvinylformal manufactured by Chisso Corporation

Component (E)

N740: a phenol novolak-type epoxy resin, EPICLON N740 (semisolid at normal temperatures), manufactured by Dainippon Ink and Chemicals Inc.

N775: a phenol novolak-type epoxy resin, EPICLON N775 (softening point: 70–80° C.), manufactured by Dainippon Ink and Chemicals Inc.

Measurement of Viscosities

Use was made of a dynamic viscoelasticity measuring instrument RDA-700 manufactured by Rheometric Scientific F. E. Ltd. The uncured epoxy resin composition for FRP whose viscosity was to be measured was filled between two disk plates of 25 mm in diameter and the viscosity of the epoxy resin was measured under conditions in which the atmospheric temperature for the measurement was 60° C., the space between the disk plates was 0.5 mm, and the shear rate was 10 radians/sec.

$G_{IC}$

In accordance with ASTM-E399, the $G_{IC}$ was measured by the compact tension method.

Evaluation of the Handleability of the Prepreg

The prepreg was subjected to a manual sensory test and was evaluated based on the following criteria:

○: both the tack and the flexibility were good and winding around a mandrel was quite easy.

Δ: flexibility was lacking and the winding around a mandrel was somewhat difficult.

X: the tack was very strong and winding around a mandrel was difficult.

Measurement of Flexural Strength in a Direction of 90°

Carbon fibers having an elastic modulus of 220 to 250 GPa were impregnated with the epoxy resin composition for FRP to form unidirectional prepregs wherein the carbon fiber areal weight was 150 g/m² and the content of the epoxy resin for FRP was 31% by weight. Fifteen layers of the thus made unidirectional prepregs were placed one on top of the other with the direction of the fibers being at 0 degrees in order to mold a unidirectional laminate (2 mm in thickness). This unidirectional laminate was cut to obtain a test piece having a length of 60 mm in a direction of 90° to the direction of the fibers and a width of 10 mm. The maximum load necessary to break the test piece was measured under conditions in which the distance between the supports was 32 mm, the tip diameter of the indenter was 3.2 mm, and the rate of travel of the indenter was 2 mm/min and the flexural strength in a direction of 90° to the axes of the fibers was calculated.

More specifically, by using a universal testing machine, TENSILON, available from Orientec Corporation, the test piece measuring 60 mm in length, 10 mm in width, and 2 mm in thickness was put to test under such test conditions that the L/D was 16 and the rate of travel of the indenter having a tip diameter of 3.2 mm was 2 mm/min, wherein L/D represents [the distance between the supports]/[the thickness of the test piece].

Measurement of flexural Strength in the Direction of the Axes of the Fibers

In the measurement of the flexural strength in the direction of the axes of the fibers, a test piece measuring 120 mm in length in the direction of the axes of the fibers, 10 mm in width, and 2 mm in thickness was used and tested under such conditions that the rate of travel of the indenter having a tip diameter of 3.2 mm was 2 mm/min in the same way as in the method for measuring the flexural strength in a direction of 90°, except that L/D was 40.

Measurement of the Crushing Strength

Carbon fibers having an elastic modulus of 220 to 250 GPa were impregnated with the epoxy resin composition for FRP to form unidirectional prepregs wherein the carbon fiber areal weight was 150 g/m² and the content of the epoxy resin for FRP was 31% by weight. The unidirectional prepregs were placed one on top the other so that the directions of the fibers might be +45°/−45°/+45°/−45°/0°/0°/0° to mold a tubular molded article having an inner diameter of 10 mm, an outer diameter of 12 mm and a volume content of fibers of 60±1%. The tubular molded article was cut into a 10 mm length to obtain a test piece. A load was applied to the test piece by using an indenter and the maximum load required until the test piece broke with the rate of travel of the indenter being 5 mm/min was measured, the maximum load being designated the crushing strength.

More specifically, by using a universal testing machine, TENSILON, available from Orientec Corporation, a load was applied to each of eight test pieces radially by the indenter to smash it and the maximum load required until it was broken was measured. The average value of the eight measurements was designated the crushing strength.

Four-Point Flexural Test of FRP Tubular Molded Articles

As a test piece, a tubular molded article was prepared in which, in order to prevent stresses from being concentrated, aluminum rings having an inner diameter of 11.5 mm, a wall thickness of 2 mm, and a width of 10 mm were mounted on parts where supports and indenters would come in contact with the tubular molded article. Using a universal testing machine, TENSILON, available from Orientec Corporation, a load was applied to each of such test pieces under such conditions that the distance between the movable indenters was 500 mm, the distance between the fixed indenters (supports) was 150 mm, and the rate of travel of the indenter was 15 mm/min to measure the flexural strength. The average value of six such measurements was designated the flexural strength. Both the measurement of the crushing strength and the four-point flexural test were carried out under atmospheric conditions at 21° C. and 50% RH.

Glass Transition Temperature (Tg) of the Cured Resin

By using a dynamic viscoelasticity measuring instrument, RDA-700, available from Rheometric Scientific F. E. Ltd., a shearing force was applied to a test piece 60 mm in length, 12 mm in width, and 2 mm in width at a rate of 10 radians/sec with the temperature increased at 5° C./STEP and the temperature dependence of the storage modulus was measured. The intersection of the tangent of the storage modulus curve to the glass state region with the tangent to the transition region was found as the glass transition temperature.

Formation of a Shaft for the Measurement of the Torsional Strength

Each of the shafts for golf clubs was made using the above prepregs in the following manner.

First, the prepregs were cut in such a manner that when the prepreg was wound around a tapered mandrel whose small-diameter part had an outer diameter of 4.6 mm, whose large-diameter part had an outer diameter of 14.3 mm, and whose length was 1,500 mm, with the direction of the fibers forming an angle of +45°, two layers would be formed at the opposite ends, and when the prepreg was wound around it with the direction of the fibers forming an angle of −45°, the same formation would be secured. Then these prepregs were stuck together with the directions of the fibers orthogonal to each other. The laminated prepreg was wound around the mandrel to form an angle layer. Then, a straight layer was formed by winding three of the prepregs on the above angle layer so that the above angle might be 0°. Then after a polypropylene tape having a width of 20 mm and a thickness of 30 μm was wound thereon with a pitch of 2 mm being secured, it was placed in a curing oven, where it was heated at a temperature of 145° C. for 240 min to cure the resin. After the curing, the core was removed, the polypropylene tape was torn off, a length of 10 mm was cut off from the small-diameter part and from the large-diameter part to obtain a shaft for a golf club for the test.

Measurement of the Torsional Strength

The torsional strength of each of the shafts for golf clubs made in the above manner was measured. The measurement was carried out in accordance with the torsional test of the qualification standard and standard certification method of shafts for golf clubs (5 San No. 2087 (Oct. 4, 1993) approved by Minister of Japanese Ministry of International Trade & Industry) settled by Product Safety Society. First, by using a "5KN universal tester" (manufactured by Mechatronics Engineering Inc.), the small-diameter part of the test golf club shaft was fixed, torque was applied to the large-diameter part, and when the shaft broke due to the torsion, this torsion was designated the torsional strength, and its torsional angle was designated the break angle. The product of the torsional strength and the break angle was expressed as the torsional breaking energy.

Examples 1 to 11 and Comparative Examples 1 to 5

Epoxy resin compositions having the formulations (the values indicate parts by weight) shown in Tables 1 and 2 were prepared and each of them was coated to a release paper. Unidirectionally arranged carbon fibers (TR30G-12L manufactured by Mitsubishi Rayon Co., Ltd.) were placed on the epoxy resin composition to allow them to be impregnated with the epoxy resin composition thereby obtaining a unidirectional prepreg wherein the carbon fiber areal weight was 150 g/m² and the resin content was 31% by weight. The viscosities of the used epoxy resin compositions and the results of the evaluation of the handleability of the obtained prepregs are also shown in Tables 1 and 2.

Then, the obtained prepregs were laminated with the directions of the carbon fiber arranged and each of the obtained laminates was subjected to vacuum bag molding under curing conditions at 130° C. for 1 hour to obtain an FRP unidirectional molded article having the carbon fibers as reinforcing fibers (hereinafter referred to as unidirectional molded article). With respect to the obtained unidirectional molded articles, a flexural test in a direction of the axes of the fibers and in a direction at right angles to the axes of the fibers, and measurement of the glass transition temperature were carried out. The results of the measurements are also shown in Tables 1 and 2.

Further, the obtained prepregs were stuck together with the directions of the fibers orthogonal to each other to form laminated prepreg each having two layers. Then, each laminated prepreg was wounded two times around a mandrel having a diameter of 10 mm so that the directions of the fibers might be at ±45 degrees with respect to the length of the mandrel to form four prepreg layers with the two layers having +45 degrees and the two layers having −45 degrees arranged orthogonally to each other. Then, further, the prepreg was wound three times around the mandrel with the direction of the fibers in line with the length of the mandrel to form three 0-degree layers. The molding of the thus formed laminate was carried out by taping polypropylene molding tape (having a thickness of 30 μm and a width of 15 mm) to the surface with the tension being 6.5 kg/15 mm and the pitch being 3 mm and heating in a curing oven at 130° C. for 1 hour. After the curing, the mandrel was withdrawn and the tape was unwound to obtain a tubular molded article having a wall thickness of 1.0 mm and carbon fibers as reinforcing fibers (hereinafter referred to as tubular molded article). With respect to the thus obtained tubular molded articles, the crushing test was carried out. The results are shown in Tables 1 and 2.

In passing, unidirectional molded articles and tubular molded articles including those in the following Examples and Comparative Examples were all prepared so as to have a volume content of carbon fibers of 60±1% unless otherwise stated.

TABLE 1

| | | Example | | | | |
|---|---|---|---|---|---|---|
| | | 1 | 2 | 3 | 4 | 5 |
| Component (A) | EP828 | 20 | 30 | 20 | 20 | 30 |
| | EP1001 | 50 | 30 | 30 | | |
| | EP1002 | | | | 30 | 40 |
| | EP1004 | | | | | |
| Component (B) | XAC4151 | 30 | 40 | 50 | | |
| | XAC4152 | | | | 50 | 30 |
| Component (C) | DICY | 5 | 5 | 5 | 5 | 5 |
| | DCMU | 4 | 4 | 4 | 4 | 4 |
| | PDMU | | | | | |
| Component (E) | N740 | | | | | |
| | N775 | | | | | |
| Viscosity (poises, 60° C.) | | 1,700 | 758 | 702 | 2,040 | 898 |
| $G_{IC}$ of the resin (J/m$^2$) | | 640 | 690 | 700 | 710 | 600 |
| Handleability of the prepreg | | ○ | ○ | ○ | ○ | ○ |
| Carbon fibers | | TR30G | TR30G | TR30G | TR30G | TR30G |
| Flexural strength of the unidirectional molded article (MPa) | In the direction of fibers | 1,637 | 1,627 | 1,646 | 1,637 | 1,656 |
| | In a direction of 90° | 131 | 133 | 137 | 127 | 132 |
| Glass transition temperature (° C.) | | 122 | 126 | 127 | 125 | 120 |
| Crushing strength of the tubular molded article (N) | | 235 | 245 | 255 | 245 | 245 |
| Torsional strength (N · m) | | 13.1 | 13.1 | 13.2 | 13.0 | 13.3 |
| Break angle (°) | | 101 | 101 | 102 | 100 | 100 |
| Torsional breaking energy (N · m°) | | 1,323 | 1,323 | 1,346 | 1,300 | 1,330 |

| | | Example | | | | | |
|---|---|---|---|---|---|---|---|
| | | 6 | 7 | 8 | 9 | 10 | 11 |
| Component (A) | EP828 | 50 | 30 | 50 | 30 | 40 | 40 |
| | EP1001 | | | | | | |
| | EP1002 | | 40 | | | 50 | 30 |
| | EP1004 | 30 | | 30 | | | |
| Component (B) | XAC4151 | 20 | 30 | 20 | 70 | 10 | 10 |
| | XAC4152 | | | | | | |
| Component (C) | DICY | 5 | 5 | 5 | 5 | 5 | 5 |
| | DCMU | 4 | | | 4 | 4 | 4 |
| | PDMU | | 2 | 2 | | | |
| Component (E) | N740 | | | | | | |
| | N775 | | | | | | 20 |
| Viscosity (poises, 60° C.) | | 1,600 | 748 | 1,330 | 745 | 694 | 600 |
| $G_{IC}$ of the resin (J/m$^2$) | | 510 | 610 | 500 | 720 | 450 | 470 |
| Handleability of the prepreg | | ○ | ○ | ○ | ○ | ○ | ○ |
| Carbon fibers | | TR30G | TR30G | TR30G | TR30G | TR30G | TR30G |
| Flexural strength of the unidirectional molded article (MPa) | In the direction of fibers | 1,646 | 1,676 | 1,666 | 1,715 | 1,637 | 1,666 |
| | In a direction of 90° | 127 | 137 | 132 | 118 | 120 | 131 |

TABLE 1-continued

| | | | | | | |
|---|---|---|---|---|---|---|
| Glass transition temperature (° C.) | 122 | 120 | 122 | 130 | 112 | 132 |
| Crushing strength of the tubular molded article (N) | 225 | 255 | 235 | 206 | 216 | 206 |
| Torsional strength (N · m) | 13.0 | 13.2 | 13.1 | 12.0 | 12.1 | 13.1 |
| Break angle (°) | 100 | 102 | 101 | 98 | 98 | 101 |
| Torsional breaking energy (N · m°) | 1,300 | 1,346 | 1,346 | 1,176 | 1,186 | 1,323 |

TABLE 2

| | | Comparative Example | | | | |
|---|---|---|---|---|---|---|
| | | 1 | 2 | 3 | 4 | 5 |
| Component (A) | EP828 | 5 | | 5 | 60 | 3 |
| | EP1001 | 65 | | 65 | | 47 |
| | EP1002 | | 50 | | | |
| | EP1004 | | | | | |
| Component (B) | XAC4151 | | | | | |
| | XAC4152 | | | | 40 | 50 |
| Component (C) | DICY | 5 | 5 | 5 | 5 | 5 |
| | DCMU | 4 | 4 | | 4 | 4 |
| | PDMU | | | 2 | | |
| Component (E) | N740 | 30 | 50 | 30 | | |
| | N775 | | | | | |
| Viscosity (poises, 60° C.) | | 901 | 775 | 748 | 93 | 5,390 |
| $G_{IC}$ of the resin (J/m$^2$) | | 320 | 280 | 290 | 670 | 730 |
| Handleability of the prepreg | | ○ | ○ | ○ | x | Δ |
| Carbon fibers | | TR30G | TR30G | TR30G | TR30G | TR30G |
| Flexural strength of the unidirectional molded article (MPa) | In the direction of fibers | 1,637 | 1,646 | 1,646 | 1,686 | 1,646 |
| | In a direction of 90° | 115 | 111 | 123 | 137 | 73.5 |
| Glass transition temperature (° C.) | | 122 | 125 | 123 | 132 | 124 |
| Crushing strength of the tubular molded article (N) | | 186 | 176 | 176 | 255 | 167 |
| Torsional strength (N · m) | | 11.8 | 11.6 | 12.1 | 13.2 | 7.5 |
| Break angle (°) | | 96 | 95 | 98 | 102 | 55 |
| Torsional breaking energy (N · m°) | | 1,133 | 1,102 | 1,186 | 1,346 | 413 |

Examples 12 to 14 and Comparative Examples 6 to 8

Prepared in the same way as in Example 1, except that epoxy resin compositions having the formulations shown in Tables 3 and 4 were prepared and HR40-12M manufactured by Mitsubishi Rayon Co., Ltd. were used as the carbon fibers. The handleability of the prepregs and the properties of the unidirectional molded articles and tubular molded articles were evaluated. The results are also shown in Tables 3 and 4.

TABLE 3

| | | Example | | |
|---|---|---|---|---|
| | | 12 | 13 | 14 |
| Component (A) | EP828 | 20 | 20 | 30 |
| | EP1001 | 50 | | |
| | EP1002 | | 30 | 40 |
| | EP1004 | | | |
| Component (B) | XAC4151 | 30 | | 30 |
| | XAC4152 | | 50 | |
| Component (C) | DICY | 5 | 5 | 5 |
| | DCMU | 4 | 4 | |
| | PDMU | | | 2 |
| Component (E) | N740 | | | |
| Viscosity (poises, 60° C.) | | 1,700 | 2,040 | 748 |
| $G_{IC}$ of the resin (J/m$^2$) | | 640 | 710 | 610 |

TABLE 3-continued

| | | Example | | |
|---|---|---|---|---|
| | | 12 | 13 | 14 |
| Handleability of the prepreg | | ○ | ○ | ○ |
| Carbon fibers | | HR40 | HR40 | HR40 |
| Flexural strength of the unidirectional molded article (MPa) | In the direction of fibers | 1,578 | 1,617 | 1,617 |
| | In a direction of 90° | 99 | 98 | 101 |
| Glass transition temperature (° C.) | | 122 | 125 | 120 |
| Crushing strength of the tubular molded article (N) | | 186 | 206 | 196 |
| Torsional strength (N · m) | | 9.9 | 9.9 | 9.9 |
| Break angle (°) | | 76 | 76 | 77 |
| Torsional breaking energy (N · m°) | | 752 | 752 | 762 |

TABLE 4

| | | Comparative Example | | |
|---|---|---|---|---|
| | | 6 | 7 | 8 |
| Component (A) | EP828 | 5 | | 5 |
| | EP1001 | 65 | | 65 |
| | EP1002 | | 50 | |
| | EP1004 | | | |

TABLE 4-continued

|  |  | Comparative Example | | |
|---|---|---|---|---|
|  |  | 6 | 7 | 8 |
| Component (B) | XAC4151 | | | |
|  | XAC4152 | | | |
| Component (C) | DICY | 5 | 5 | 5 |
|  | DCMU | 4 | 4 | |
|  | PDMU | | | 2 |
| Component (E) | N740 | 30 | 50 | 30 |
| Viscosity (poises, 60° C.) | | 901 | 775 | 748 |
| $G_{IC}$ of the resin (J/m$^2$) | | 320 | 280 | 290 |
| Handleability of the prepreg | | ○ | ○ | ○ |
| Carbon fibers | | HR40 | HR40 | HR40 |
| Flexural strength of the unidirectional molded article (MPa) | In the direction of fibers | 1,588 | 1,578 | 1,568 |
|  | In a direction of 90° | 80 | 79 | 81 |
| Glass transition temperature (° C.) | | 122 | 125 | 123 |
| Crushing strength of the tubular molded article (N) | | 137 | 127 | 132 |

TABLE 4-continued

|  | Comparative Example | | |
|---|---|---|---|
|  | 6 | 7 | 8 |
| Torsional strength (N · m) | 8.2 | 8.1 | 8.2 |
| Break angle (°) | 67 | 66 | 67 |
| Torsional breaking energy (N · m°) | 549 | 535 | 549 |

Examples 15 to 38 and Comparative Examples 9 to 20

Prepared in the same way as in Example 1, except that epoxy resin compositions having the formulations shown in Tables 5 to 8 were prepared and TR30S-12L manufactured by Mitsubishi Rayon Co., Ltd. were used as the carbon fibers. The handleability of the prepregs and the properties of the unidirectional molded articles and tubular molded articles were evaluated. The results are also shown in Tables 5 to 8.

TABLE 5

|  |  | Example | | | | | |
|---|---|---|---|---|---|---|---|
|  |  | 15 | 16 | 17 | 18 | 19 | 20 |
| Component (A) | EP828 | 30 | 30 | 30 | 55 | 45 | 35 |
|  | EP1001 | | | | | | |
|  | EP1002 | | | | 25 | 35 | 45 |
| Component (B) | XAC4151 | | | | | | |
|  | XAC4152 | 70 | 70 | 70 | 20 | 20 | 20 |
| Component (C) | DICY | 4 | 4 | 4 | 4 | 4 | 4 |
|  | DCMU | 4 | 4 | 4 | 4 | 4 | 4 |
|  | PDMU | | | | | | |
| Component (D) | YP-50 | 6 | 12 | 18 | 8 | 8 | 8 |
| Component (E) | N740 | | | | | | |
| Viscosity (poises, 60° C.) | | 1,100 | 1,500 | 3,500 | 1,500 | 2,800 | 4,900 |
| $G_{IC}$ of the resin (J/m$^2$) | | 720 | 730 | 750 | 530 | 550 | 540 |
| Handleability of the prepreg | | ○ | ○ | ○ | ○ | ○ | ○ |
| Carbon fibers | | TR30S | TR30S | TR30S | TR30S | TR30S | TR30S |
| Flexural strength of the unidirectional molded article (MPa) | In the direction of fibers | 1,705 | 1,686 | 1,676 | 1,656 | 1,666 | 1,656 |
|  | In a direction of 90° | 140 | 138 | 133 | 135 | 137 | 136 |
| Glass transition temperature (° C.) | | 130 | 129 | 129 | 124 | 123 | 121 |
| Crushing strength of the tubular molded article (N) | | 254.8 | 245 | 245 | 255 | 255 | 255 |
| Torsional strength (N · m) | | 13.7 | 13.4 | 13.3 | 13.3 | 13.4 | 13.4 |
| Break angle (°) | | 104 | 102 | 101 | 101 | 101 | 102 |
| Torsional breaking energy (N · m°) | | 1,394 | 1,367 | 1,343 | 1,343 | 1,353 | 1,367 |

|  |  | Example | | | | | |
|---|---|---|---|---|---|---|---|
|  |  | 21 | 22 | 23 | 24 | 25 | 26 |
| Component (A) | EP828 | 20 | 20 | 50 | 40 | 40 | 40 |
|  | EP1001 | 60 | 30 | | | | |
|  | EP1002 | | | 20 | 40 | 40 | |
| Component (B) | XAC4151 | | | 30 | | | 30 |
|  | XAC4152 | 20 | 50 | | 20 | 20 | |
| Component (C) | DICY | 4 | 4 | 4 | 4 | 4 | 4 |
|  | DCMU | 4 | 4 | 4 | 4 | | |
|  | PDMU | | | | | 4 | 4 |
| Component (D) | YP-50 | 8 | 8 | 8 | 8 | 8 | 10 |
| Component (E) | N740 | | | | | | 30 |
| Viscosity (poises, 60° C.) | | 2,500 | 3,300 | 2,000 | 2,900 | 2,600 | 2,100 |
| $G_{IC}$ of the resin (J/m$^2$) | | 520 | 630 | 610 | 540 | 530 | 490 |

TABLE 5-continued

| | | | | | | | |
|---|---|---|---|---|---|---|---|
| Handleability of the prepreg | | ○ | ○ | ○ | ○ | ○ | ○ |
| Carbon fibers | | TR30S | TR30S | TR30S | TR30S | TR30S | TR30S |
| Flexural strength of the unidirectional molded article (MPa) | In the direction of fibers | 1,676 | 1,715 | 1,705 | 1,695 | 1,676 | 1,646 |
| | In a direction of 90° | 134 | 139 | 141 | 138 | 137 | 136 |
| Glass transition temperature (° C.) | | 120 | 126 | 127 | 124 | 123 | 133 |
| Crushing strength of the tubular molded article (N) | | 245 | 245 | 255 | 255 | 255 | 245 |
| Torsional strength (N · m) | | 13.3 | 13.4 | 13.7 | 13.4 | 13.3 | 13.3 |
| Break angle (°) | | 101 | 102 | 104 | 102 | 102 | 101 |
| Torsional breaking energy (N · m°) | | 1,343 | 1,367 | 1,425 | 1,367 | 1,357 | 1,343 |

TABLE 6

| | | Comparative Example | | | | | |
|---|---|---|---|---|---|---|---|
| | | 9 | 10 | 11 | 12 | 13 | 14 |
| Component (A) | EP828 | 25 | 80 | 10 | 10 | 10 | 10 |
| | EP1001 | | | 60 | 60 | 40 | 20 |
| | EP1002 | 55 | | | | | |
| Component (B) | XAC4151 | | | | | | |
| | XAC4152 | 20 | 20 | | | | |
| Component (C) | DICY | 4 | 4 | 4 | 4 | 4 | 4 |
| | DCMU | 4 | 4 | 4 | 4 | 4 | 4 |
| | PDMU | | | | | | |
| Component (D) | YP-50 | 8 | 2 | 6 | 12 | 6 | 6 |
| Component (E) | N740 | | | 30 | 30 | 50 | 70 |
| Viscosity (poises, 60° C.) | | 6,400 | 90 | 2,000 | 2,800 | 2,400 | 2,100 |
| $G_{IC}$ of the resin (J/m²) | | 550 | 510 | 300 | 350 | 270 | 260 |
| Handleability of the prepreg | | Δ | x | ○ | ○ | ○ | ○ |
| Carbon fibers | | TR30S | TR30S | TR30S | TR30S | TR30S | TR30S |
| Flexural strength of the unidirectional molded article (MPa) | In the direction of fibers | 1,637 | 1,685 | 1,676 | 1,656 | 1,656 | 1,627 |
| | In a direction of 90° | 93 | 129 | 108 | 103 | 98 | 70 |
| Glass transition temperature (° C.) | | 120 | 132 | 125 | 123 | 126 | 132 |
| Crushing strength of the tubular molded article (N) | | 186 | 196 | 176 | 176 | 186 | 167 |
| Torsional strength (N · m) | | 9.8 | 12.8 | 11.4 | 10.5 | 10.0 | 7.3 |
| Break angle (°) | | 77 | 99 | 95 | 85 | 75 | 53 |
| Torsional breaking energy (N · m°) | | 755 | 1,267 | 1,083 | 893 | 750 | 387 |

TABLE 7

| | | Example | | | | | |
|---|---|---|---|---|---|---|---|
| | | 27 | 28 | 29 | 30 | 31 | 32 |
| Component (A) | EP828 | 30 | 30 | 30 | 50 | 40 | 30 |
| | EP1001 | | | | | | |
| | EP1002 | | | | 30 | 40 | 50 |
| Component (B) | XAC4151 | | | | | | |
| | XAC4152 | 70 | 70 | 70 | 20 | 20 | 20 |
| Component (C) | DICY | 4 | 4 | 4 | 4 | 4 | 4 |
| | DCMU | 4 | 4 | 4 | 4 | 4 | 4 |
| | PDMU | | | | | | |
| Component (D) | VINYLEC E | 3 | 6 | 9 | 4 | 4 | 4 |
| | VINYLEC K | | | | | | |
| Component (E) | N740 | | | | | | |
| Viscosity (poises, 60° C.) | | 980 | 1,400 | 3,000 | 1,200 | 2,500 | 4,900 |
| $G_{IC}$ of the resin (J/m²) | | 730 | 730 | 740 | 510 | 570 | 550 |
| Handleability of the prepreg | | ○ | ○ | ○ | ○ | ○ | ○ |
| Carbon fibers | | TR30S | TR30S | TR30S | TR30S | TR30S | TR30S |
| Flexural strength of the unidirectional molded article (MPa) | In the direction of fibers | 1,715 | 1,695 | 1,676 | 1,646 | 1,637 | 1,646 |
| | In a direction of 90° | 144 | 143 | 149 | 145 | 140 | 137 |
| Glass transition temperature (° C.) | | 129 | 130 | 128 | 126 | 124 | 121 |
| Crushing strength of the tubular molded article (N) | | 265 | 255 | 265 | 274 | 265 | 255 |

TABLE 7-continued

|  |  |  |  |  |  |  |  |
|---|---|---|---|---|---|---|---|
| Torsional strength (N · m) |  | 13.7 | 13.5 | 13.8 | 13.7 | 13.8 | 13.4 |
| Break angle (°) |  | 103 | 103 | 104 | 102 | 105 | 101 |
| Torsional breaking energy (N · m°) |  | 1,411 | 1,391 | 1,435 | 1,397 | 1,449 | 1,353 |

|  |  | Example |  |  |  |  |  |
|---|---|---|---|---|---|---|---|
|  |  | 33 | 34 | 35 | 36 | 37 | 38 |
| Component (A) | EP828 | 20 | 20 | 50 | 40 | 40 | 40 |
|  | EP1001 | 60 | 30 |  |  |  |  |
|  | EP1002 |  |  | 20 | 40 | 40 |  |
| Component (B) | XAC4151 |  |  | 30 |  |  | 30 |
|  | XAC4152 | 20 | 50 |  | 20 | 20 |  |
| Component (C) | DICY | 4 | 4 | 4 | 4 | 4 | 4 |
|  | DCMU | 4 | 4 | 4 | 4 |  |  |
|  | PDMU |  |  |  |  | 4 | 4 |
| Component (D) | VINYLEC E | 4 | 4 | 4 |  | 4 | 5 |
|  | VINYLEC K |  |  |  | 5 |  |  |
| Component (E) | N740 |  |  |  |  |  | 30 |
| Viscosity (poises, 60° C.) |  | 2,200 | 3,100 | 1,800 | 2,700 | 2,500 | 2,000 |
| $G_{IC}$ of the resin (J/m$^2$) |  | 520 | 640 | 600 | 540 | 540 | 500 |
| Handleability of the prepreg |  | ○ | ○ | ○ | ○ | ○ | ○ |
| Carbon fibers |  | TR30S | TR30S | TR30S | TR30S | TR30S | TR30S |
| Flexural strength of the unidirectional molded article (MPa) | In the direction of fibers | 1,656 | 1,705 | 1,715 | 1,705 | 1,695 | 1,646 |
|  | In a direction of 90° | 141 | 146 | 139 | 138 | 136 | 134 |
| Glass transition temperature (° C.) |  | 120 | 125 | 127 | 123 | 123 | 133 |
| Crushing strength of the tubular molded article (N) |  | 265 | 265 | 265 | 265 | 255 | 245 |
| Torsional strength (N · m) |  | 14.1 | 13.8 | 13.5 | 13.5 | 13.4 | 13.3 |
| Break angle (°) |  | 107 | 104 | 102 | 102 | 101 | 101 |
| Torsional breaking energy (N · m°) |  | 1,509 | 1,435 | 1,377 | 1,377 | 1,353 | 1,343 |

TABLE 8

|  |  | Comparative Example |  |  |  |  |  |
|---|---|---|---|---|---|---|---|
|  |  | 15 | 16 | 17 | 18 | 19 | 20 |
| Component (A) | EP828 | 25 | 80 | 10 | 10 | 10 | 10 |
|  | EP1001 |  |  | 60 | 60 | 40 | 20 |
|  | EP1002 | 55 |  |  |  |  |  |
| Component (B) | XAC4151 |  |  |  |  |  |  |
|  | XAC4152 | 20 | 20 |  |  |  |  |
| Component (C) | DICY | 4 | 4 | 4 | 4 | 4 | 4 |
|  | DCMU | 4 | 4 | 4 | 4 | 4 | 4 |
|  | PDMU |  |  |  |  |  |  |
| Component (D) | VINYLEC E | 4 | 2 | 3 | 6 | 3 | 3 |
|  | VINYLEC K |  |  |  |  |  |  |
| Component (E) | N740 |  |  | 30 | 30 | 50 | 70 |
| Viscosity (poises, 60° C.) |  | 6,200 | 90 | 1,800 | 2,500 | 2,200 | 1,800 |
| $G_{IC}$ of the resin (J/m$^2$) |  | 530 | 520 | 290 | 360 | 270 | 240 |
| Handleability of the prepreg |  | Δ | x | ○ | ○ | ○ | ○ |
| Carbon fibers |  | TR30S | TR30S | TR30S | TR30S | TR30S | TR30S |
| Flexural strength of the unidirectional molded article (MPa) | In the direction of fibers | 1,656 | 1,705 | 1,666 | 1,666 | 1,656 | 1,637 |
|  | In a direction of 90° | 98 | 131 | 113 | 108 | 103 | 78 |
| Glass transition temperature (° C.) |  | 121 | 133 | 124 | 123 | 127 | 134 |
| Crushing strength of the tubular molded article (N) |  | 196 | 216 | 206 | 196 | 196 | 206 |
| Torsional strength (N · m) |  | 10.1 | 13 | 11.5 | 11.4 | 10.8 | 7.5 |
| Break angle (°) |  | 82 | 100 | 95 | 94 | 85 | 56 |
| Torsional breaking energy (N · m°) |  | 828 | 1,300 | 1,420 | 1,072 | 918 | 420 |

Examples 39 to 41 and Comparative Examples 21 to 23

Prepared in the same way as in Example 1, except that the carbon fibers and the epoxy resin compositions shown in Tables 9 and 10 were used. The flexural strength in a direction of 90° of unidirectional molded articles and the crushing strength of tubular molded articles were evaluated. The results are also shown in Tables 9 and 10.

TABLE 9

|  | Example | | | |
|---|---|---|---|---|
|  | 30 | 39 | 40 | 41 |
| Carbon fibers | TR30S | MR40 | HR40 | HS40 |
| Elastic modulus of the carbon fibers (GPa) | 235 | 294 | 392 | 451 |
| Epoxy resin composition | Ex. 30 | Ex. 30 | Ex. 30 | Ex. 30 |
| Resin content (wt. %) | 30 | 30 | 30 | 30 |
| 25,000/the elastic modulus of the carbon fibers | 107 | 85 | 64 | 56 |
| Flexural strength in a direction of 90° (MPa) | 145 | 124 | 103 | 91 |
| Crushing strength of the tubular molded article (N) | 274 | 255 | 221 | 211 |
| Torsional strength (N · m) | 13.7 | 12.3 | 10.2 | 9.0 |
| Break angle (°) | 102 | 93 | 79 | 70 |
| Torsional breaking energy (N · m°) | 1,397 | 1,144 | 806 | 630 |

TABLE 10

|  | Comparative Example | | | |
|---|---|---|---|---|
|  | 19 | 21 | 22 | 23 |
| Carbon fibers | TR30S | MR40 | HR40 | HS40 |
| Elastic modulus of the carbon fibers (GPa) | 235 | 294 | 392 | 451 |
| Epoxy resin composition | Comp. Ex. 19 | Comp. Ex. 19 | Comp. Ex. 19 | Comp. Ex. 19 |
| Resin content (wt. %) | 30 | 30 | 30 | 30 |
| 25,000/the elastic modulus of the carbon fibers | 107 | 85 | 64 | 56 |
| Flexural strength in a direction of 90° (MPa) | 103 | 80 | 59 | 54 |
| Crushing strength of the tubular molded article (N) | 196 | 162 | 136 | 130 |
| Torsional strength (N · m) | 10.8 | 8.8 | 7.0 | 6.2 |
| Break angle (°) | 85 | 68 | 53 | 48 |
| Torsional breaking energy (N · m°) | 918 | 598 | 371 | 298 |

Example 42 and Comparative Example 24

Prepared in the same way as in Example 1, except that HR40-12M manufactured by Mitsubishi Rayon Co., Ltd. were used as the carbon fibers and the compositions of Example 30 and Comparative Example 19 were used as the matrix resin. The flexural strength in a direction of 90° of unidirectional molded articles and the crushing strength of tubular molded articles were evaluated. The results are shown in Table 11.

Further, using the same two types of epoxy resin compositions and TR30-3L, two types of low-weight prepregs having a prepreg areal weight of 48 g/m² and a resin content of 40% by weight were produced.

Then the obtained high-weight prepregs and low-weight prepregs were stuck together such that the directions of the carbon fibers were orthogonal to each other, thereby obtaining laminated prepregs. The obtained prepregs were good prepregs wherein there were no defectively bonded parts and evaluation by touch showed that the surface was smooth.

TABLE 11

|  | Example | | Comparative Example | |
|---|---|---|---|---|
|  | 40 | 42 | 22 | 24 |
| Carbon fibers | HR40 | HR40 | HR40 | HR40 |
| Elastic modulus of the carbon fibers (GPa) | 392 | 392 | 392 | 392 |
| Epoxy resin composition | Ex. 30 | Ex. 30 | Comp. Ex. 19 | Comp. Ex. 19 |
| Resin content (wt. %) | 30 | 20 | 30 | 20 |
| 100,000 × the resin fraction of the prepreg/the elastic modulus of the carbon fibers | 77 | 51 | 77 | 51 |
| Flexural strength in a direction of 90° (MPa) | 103 | 68 | 59 | 46 |
| Crushing strength of the tubular molded article (N) | 221 | 147 | 136 | 98 |

Examples 43 to 48 and Comparative Examples 25 and 26

Using the epoxy resin compositions prepared in Example 23 and Comparative Example 13 and the following two types of carbon fibers, four types of high-weight prepregs having a prepreg areal weight of 180 g/m² and a resin content of 30% by weight were produced.
[Used Carbon Fibers]
TR30S-12L: manufactured by Mitsubishi Rayon Co., Ltd.; has an elastic modulus of 235 GPa
MR40-12M: manufactured by Mitsubishi Rayon Co., Ltd.; has an elastic modulus of 294 GPa Each prepreg was wound around a mandrel having a diameter of 10 mm four times (equivalent to 8 layers) with the low-weight prepreg inside so that the circumferential direction might be reinforced. Then molding thereof was carried out in the same way for the tubular molded article in Example 1, thereby obtaining a tubular molded article having a length of 600 mm, a wall thickness of 0.58 mm, and a weight of 18 g. The average volume content of the carbon fibers of this tubular molded article was 56%.

The flexural test of the obtained molded articles was carried out. The results are shown in Tables 12 and 13.

TABLE 12

|  |  | Example | | | |
|---|---|---|---|---|---|
|  |  | 43 | 44 | 45 | 46 |
| Axial reinforcing layer | Carbon fibers | TR30S | TR30S | TR30S | MR40 |
|  | Epoxy resin composition | Ex. 23 | Comp. Ex. 13 | Ex. 23 | Ex. 23 |
|  | Resin content (wt. %) | 30 | 30 | 30 | 30 |
| Circumferential reinforcing layer | Carbon fibers | TR30 | TR30 | TR30 | TR30 |
|  | Epoxy resin composition | Ex. 23 | Ex. 23 | Comp. Ex. 13 | Ex. 23 |
|  | Resin content (wt. %) | 40 | 40 | 40 | 40 |
| Four-point flexural properties | Strength (MPa) | 1,216 | 1,193 | 1,193 | 1,298 |
|  | Elastic modulus (GPa) | 131 | 131 | 131 | 164 |
|  | Breaking strain (%) | 1.19 | 1.28 | 1.28 | 1.19 |

TABLE 13

|  |  | Example | | Comparative Example | |
|---|---|---|---|---|---|
|  |  | 47 | 48 | 25 | 26 |
| Axial reinforcing layer | Carbon fibers | MR40 | MR40 | TR30S | MR40 |
|  | Epoxy resin composition | Comp. Ex. 13 | Ex. 23 | Comp. Ex. 13 | Comp. Ex. 13 |
|  | Resin content (wt. %) | 30 | 30 | 30 | 30 |
| Circumferential reinforcing layer | Carbon fibers | TR30 | TR30 | TR30 | TR30 |
|  | Epoxy resin composition | Ex. 23 | Comp. Ex. 13 | Comp. Ex. 13 | Comp. Ex. 13 |
|  | Resin content (wt. %) | 40 | 40 | 40 | 40 |
| Four-point flexural properties | Strength (MPa) | 1,271 | 1,199 | 1,173 | 1,250 |
|  | Elastic modulus (GPa) | 163 | 163 | 127 | 155 |
|  | Breaking strain (%) | 1.15 | 1.01 | 1.22 | 1.14 |

Examples 49 to 53 and Comparative Examples 27 and 28

Tubular molded articles were obtained and evaluated in the same manner as in Examples 43 to 48 and Comparative Examples 27 and 28, except that the epoxy resin compositions prepared in Example 30 and Comparative Example 19 were used.

The results are shown in Tables 14 and 15.

TABLE 14

|  |  | Example | | | | |
|---|---|---|---|---|---|---|
|  |  | 49 | 50 | 51 | 52 | 53 |
| Axial reinforcing layer | Carbon fibers | TR30S | TR30S | TR30S | MR40 | MR40 |
|  | Epoxy resin composition | Ex. 30 | Comp. Ex. 19 | Ex. 30 | Ex. 30 | Comp. Ex. 19 |
|  | Resin content (wt. %) | 30 | 30 | 30 | 30 | 30 |
| Circumferential reinforcing layer | Carbon fibers | TR30 | TR30 | TR30 | TR30 | TR30 |
|  | Epoxy resin composition | Ex. 30 | Ex. 30 | Comp. Ex. 19 | Ex. 30 | Ex. 30 |
|  | Resin content (wt. %) | 40 | 40 | 40 | 40 | 40 |
| Four-point flexural properties | Strength (MPa) | 1,231 | 1,213 | 1,203 | 1,308 | 1,281 |
|  | Elastic modulus (GPa) | 132 | 132 | 132 | 165 | 164 |
|  | Breaking strain (%) | 1.29 | 1.29 | 1.29 | 1.20 | 1.16 |

TABLE 15

|  |  | Comparative Example | |
|---|---|---|---|
|  |  | 27 | 28 |
| Axial reinforcing layer | Carbon fibers | TR30S | MR40 |
|  | Epoxy resin composition | Comp. Ex. 19 | Comp. Ex. 19 |
|  | Resin content (wt. %) | 30 | 30 |

TABLE 15-continued

|  |  | Comparative Example | |
|---|---|---|---|
|  |  | 27 | 28 |
| Circumferential reinforcing layer | Carbon fibers | TR30 | TR30 |
|  | Epoxy resin composition | Comp. Ex. 19 | Comp. Ex. 19 |
|  | Resin content (wt. %) | 40 | 40 |
| Four-point flexural properties | Strength (MPa) | 1,173 | 1,250 |
|  | Elastic modulus (GPa) | 127 | 155 |
|  | Breaking strain (%) | 1.22 | 1.14 |

Examples 53 to 58 and Comparative Examples 29 and 30

Tubular molded articles were obtained and evaluated in the same manner as in Examples 43 to 48 and Comparative Examples 27 and 28, except that instead of the low-weight prepregs constituting the inside of the tubular molded articles, a glass scrim cloth prepreg manufactured by Nitto Boseki Co., Ltd. (Product No.: WP (A) 03 104; areal weight: 24.5 g/m$^2$; epoxy resin content: 26 wt. %) was used.

The results are shown in Tables 16 and 17.

TABLE 16

|  |  | Example | | | |
|---|---|---|---|---|---|
|  |  | 55 | 56 | 57 | 58 |
| Prepreg | Carbon fibers | TR30S | MR40 | TR30S | MR40 |
|  | Epoxy resin composition | Ex. 23 | Ex. 23 | Ex. 30 | Ex. 30 |
| Physical properties of the tubular molded article | Crushing strength (N) | 220 | 151 | 230 | 165 |
|  | Breaking strength (MPa) | 135 | 78.7 | 136 | 78.9 |
|  | Elastic modulus (MPa) | 7,281 | 6,840 | 7,291 | 6,899 |
|  | Breaking strain (%) | 1.86 | 1.25 | 1.88 | 1.14 |

TABLE 17

|  |  | Comparative Example | |
|---|---|---|---|
|  |  | 29 | 30 |
| Prepreg | Carbon fibers | TR30S | MR40 |
|  | Epoxy resin composition | Comp. Ex. 13 | Comp. Ex. 13 |
| Physical properties of the tubular molded article | Crushing strength (N) | 172 | 107 |
|  | Breaking strength (MPa) | 86.2 | 48.8 |
|  | Elastic modulus (MPa) | 7,193 | 5,762 |
|  | Breaking strain (%) | 1.20 | 0.87 |

Examples 59 to 61

The epoxy resin compositions in Examples 1, 5 and 9 were coated on to sheets of release paper and unidirectionally arranged carbon fibers (TR30G-12L manufactured by Mitsubishi Rayon Co., Ltd.) were impregnated therewith with the opposite sides of the arranged carbon fibers being sandwiched between the sheets, thereby obtaining unidirectional prepregs having a carbon fiber areal weight of 150 g/m$^2$ and a resin content of 31% by weight.

The results of the evaluation are shown in Table 18.

TABLE 18

|  |  | Example | | |
|---|---|---|---|---|
|  |  | 50 | 60 | 61 |
| Component (A) | EP828 | 20 | 30 | 30 |
|  | EP1001 | 50 |  |  |
|  | EP1002 |  | 40 |  |
|  | EP1004 |  |  |  |
| Component (B) | XAC4151 | 30 |  | 70 |
|  | XAC4152 |  | 30 |  |
| Component (C) | DICY | 5 | 5 | 5 |
|  | DCMU | 4 | 4 | 4 |
|  | PDMU |  |  |  |
| Component (E) | N740 |  |  |  |
| Viscosity (poises, 60° C.) |  | 1,700 | 898 | 745 |
| G$_{IC}$ of the resin (J/m$^2$) |  | 640 | 600 | 720 |

TABLE 18-continued

|  |  | Example | | |
|---|---|---|---|---|
|  |  | 50 | 60 | 61 |
| Handleability of the prepreg |  | ○ | ○ | ○ |
| Carbon fibers |  | TR30G | TR30G | TR30G |
| Flexural strength of the unidirectional molded article (MPa) | In the direction of fibers | 1,640 | 1,662 | 1,705 |
|  | In a direction of 90° | 141 | 143 | 138 |
| Glass transition temperature (° C.) |  | 122 | 132 | 130 |
| Crushing strength of the tubular molded article (N) |  | 255 | 260 | 250 |
| Torsional strength (N · m) |  | 13.6 | 13.8 | 13.3 |
| Break angle (°) |  | 104 | 106 | 103 |
| Torsional breaking energy (N · m°) |  | 1,414 | 1,463 | 1,370 |
|  |  | *1 | *2 | *3 |

*1 the same resin composition as that in Example 1
*2 the same resin composition as that in Example 5
*3 the same resin composition as that in Example 9

Industrial Applicability

The epoxy resin composition for FRP of the present invention is better in adhesion to reinforcing fibers than conventional mainstream epoxy resin compositions whose major compositions are a bisphenol A-type epoxy resin and a phenolic novolak-type epoxy resin, and the prepreg thereof is quite excellent in handleability.

Further, since the FRP tubular molded article in which this epoxy resin composition is used is excellent in physical flexural properties and physical crushing properties, fishing rods and shafts of golf clubs obtained using the FRP tubular molded article can be made light in weight.

What is claimed is:

1. An epoxy resin composition, consisting essentially of (A) a bisphenol A epoxy resin, (B) an epoxy resin having oxazolidone rigs and having no isocyanate groups, (C) a curing agent, and (D) a thermoplastic resin which is soluble in a mixture of said bisphenol A epoxy resin (A) and said epoxy resin (B), said epoxy resin (B) being an epoxy resin having a structure represented by the following formula (2):

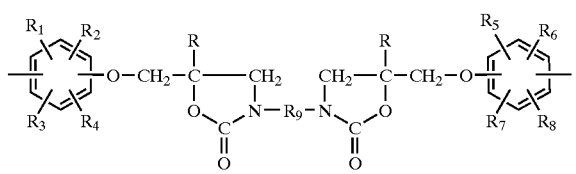

(2)

wherein R each independently represents a hydrogen atom or a methyl group, $R_1$ to $R_4$ each independently represent a halogen atom, a hydrogen atom, or an alkyl group having 1 to 4 carbon atoms, $R_5$ to $R_8$ each independently represent a hydrogen atom or an alkyl group having 1 to 4 carbon atoms, and $R_9$ represents the following formula (3) or (4):

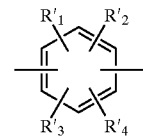

(3)

wherein $R'_1$ to $R'_4$ each independently represent a hydrogen atom or an alkyl group having 1 to 4 on atoms;

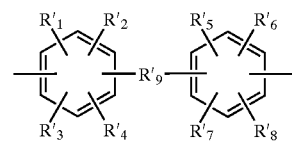

(4)

wherein $R'_1$ to $R'_8$ each independently represent a hydrogen atom or an alkyl group having 1 to 4 carbon atoms and $R'_9$ represents a single bond, $-CH_2-$, $-C(CH_3)_2-$, $-SO_2-$, $-SO-$, $-S-$, or $-O-$, and wherein said bisphenol A epoxy resin (A) is a mixture of a bisphenol A epoxy resin which has an epoxy equivalent of 300 or less and is liquid or semisolid at normal temperatures and a bisphenol A epoxy resin which has an epoxy equivalent of 400 or more and is solid at normal temperatures.

2. The epoxy resin composition as claimed in claim 1, wherein the viscosity of said epoxy resin composition of (A)+(B)+(C)+(D) is 100 to 5,000 poises at 60° C.

3. The epoxy resin composition as claimed in claim 1, wherein said themoplastic resin (D) is a phenoxy resin and/or a polyvinylformal.

4. The epoxy resin composition as claimed in claim 1, further comprising (E) other epoxy resin in an amount of 3 to 20% by weight based on the total of the epoxy resin components comprising the bisphenol A epoxy resin (A), the epoxy resin (B), and the other epoxy resin (E).

5. The epoxy resin composition as claimed in claim 1, wherein said bisphenol A epoxy resin which has an epoxy equivalent of 300 or less and is liquid or semisolid at normal temperatures is contained in an amount of 25 to 65% by weight based on the bisphenol A epoxy resin (A), and the epoxy resin (B) is contained in an amount of 20 to 50% by weight based on a mixture of the bisphenol A epoxy resin (A) and the epoxy resin (B).

6. The epoxy resin composition as claimed in claim 1, wherein the composition ratio by weight of the bisphenol A epoxy resin (A), the epoxy resin (B), and the thermoplastic resin soluble in a mixture of them (D) is such that (A)/(B)=from 15/1 to 1/5 and (D)/[(A)+(B)]=from 1/100 to 30/100.

7. The epoxy resin composition as claimed in claim 4, wherein the sum of the amount of the epoxy resin (B) added and the amount of the other epoxy resin (E) added is 20 to 50% by weight based on the total of the epoxy resin components comprising the bisphenol A epoxy resin (A), the epoxy resin (B), and the other epoxy resin (E) and the composition ratio by weight of the epoxy resin (B) to the other epoxy resin (E) is in the range of from 1/3 to 4/1.

8. The epoxy resin composition as claimed in claim 1, wherein the critical strain energy release rate $G_{IC}$ is 400 J/m$^2$ or more.

9. The epoxy resin composition as claimed in claim 4, wherein the critical strain energy release rate $G_{IC}$ is 400 J/m$^2$ or more.

10. The epoxy resin composition as claimed in claim 1, wherein said curing agent (C) is a mixture of dicyandiamide and a urea compound.

11. The epoxy resin composition as claimed in claim 4, wherein said curing agent (C) is a mixture of dicyandiamide and a urea compound.

12. A prepreg, comprising a sheet of reinforcing fibers impregnated with the epoxy resin composition as claimed in claim 1.

13. A prepreg, comprising a sheet of reinforcing fibers impregnated with the epoxy resin composition as claimed in claim 4.

14. A prepreg, comprising a sheet of reinforcing fibers impregnated with the epoxy resin composition as claimed in claim 10.

15. A prepreg, comprising a sheet of reinforcing fibers impregnated with the epoxy resin composition as claimed in claim 11.

16. A tubular molded article having a plurality of fiber reinforced plastic layers, wherein the matrix resin composition used in at least one of sad layers is the epoxy resin composition as claimed in claim 1.

17. A tubular molded article having a plurality of fiber reinforced plastic layers, wherein the matrix resin composition used in at least one of said layers is the epoxy resin composition as claimed in claim 4.

18. A tubular molded article having a plurality of fiber reinforced plastic layers, wherein the matrix resin composition used in at least one of said layers is the epoxy resin composition as claimed in claim 10.

19. A tubular molded article having a plurality of fiber reinforced plastic layers, wherein the matrix resin composition used in at least one of said layers is the epoxy resin composition as claimed in claim 11.

20. An epoxy resin composition according to claim 1, wherein the crushing strength will be 200 N or more when it is molded into a tubular shape.

21. An epoxy resin composition according to claim 1, wherein the crushing strength will be 240 N or more when it is molded into a tubular shape.

22. An epoxy resin composition according to claim 1, wherein the flexural strength in the direction of 90° is 100 MPa or more when it is formed into a unidirectional laminate.

23. An epoxy resin composition according to claim 1, wherein the flexural strength in the direction of 90° is 125 MPa or more when it is formed into a unidirectional laminate.

24. The epoxy resin composition as claimed in claim 1, wherein said bisphenol A epoxy resin having an epoxy resin equivalent of 300 or less is contained in an amount of 25 to 65% by weight in the component (A).

25. The epoxy resin composition as claimed in claim 1, wherein said viscosity is 300 to 3000 poises at 60° C.

26. The epoxy resin composition as claimed in claim 6, wherein the composition ratio by weight of the bisphenol A epoxy resin (A), the epoxy resin (B), and the thermoplastic resin soluble in a mixture of them (D) is such that (A)/(B)= from 10/1 to 1/3 and (D)/[(A)+(B)]=from 2/100 to 20/100.

* * * * *